W. O. HARDMAN.
DISK SHARPENER.
APPLICATION FILED APR. 6, 1908.
907,997.
Patented Dec. 29, 1908.
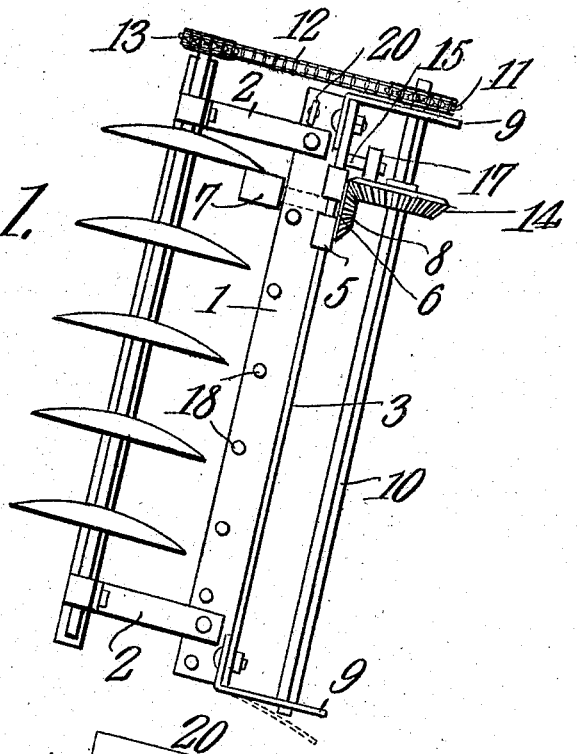
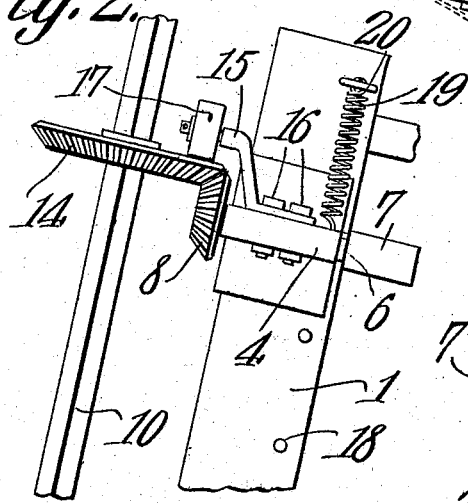
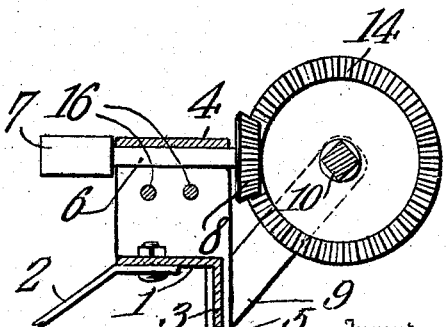
Inventor
William O. Hardman.
Witnesses
By C. A. Snow & Co.
Attorneys

UNITED STATES PATENT OFFICE.

WILLIAM O. HARDMAN, OF FREEDOM, WYOMING.

DISK-SHARPENER.

No. 907,997.     Specification of Letters Patent.     Patented Dec. 29, 1908.

Application filed April 6, 1908. Serial No. 425,412.

*To all whom it may concern:*

Be it known that I, WILLIAM O. HARDMAN, a citizen of the United States, residing at Freedom, in the county of Uinta and State of Wyoming, have invented a new and useful Disk-Sharpener, of which the following is a specification.

This invention has relation to disk sharpeners and it consists in the novel construction and arrangement of its parts as hereinafter shown and described.

The object of the invention is to provide a disk sharpener in the form of an attachment which may be easily and readily applied to or detached from the frame of a harrow or other implement of similar nature having a gang of disks.

The attachment is provided with a sharpening mechanism which may be so adjusted as to operate upon any particular disk in the gang, the sharpening member being journaled for rotation and receiving its rotary movement through means which operatively connects it with the rotating disk shaft. Means is also provided for rotating the sharpening or abrading member in either direction and for resiliently holding the said member in contact with the edge of the disk upon which it is operating.

Figure 1 is a bottom plan view of a portion of a disk implement with the sharpener applied thereto. Fig. 2 is a top plan view of a portion of the disk sharpener, and Fig. 3 is a transverse sectional view of the disk sharpener.

The attachment consists of the bar 1 which is provided with the arms 2 which are adapted to be secured to the frame of the implement to which the attachment is applied. The bar 1 is provided at its forward edge with a flange 3. The bearing 4 is provided with the hooks 5 which pass under the edge of the flange 3 while the said bearing is located upon the bar 1. The shaft 6 is journaled for rotation in the bearing 4 and is provided at its rear end with a sharpening or abrading member 7. The beveled pinion 8 is mounted upon the opposite end of the shaft 6. The spring arms 9 extend forwardly from the bar 1 and lie in planes at right angles to that occupied by the said bar. The non circular shaft 10 is journaled for rotation in the arms 9 and is provided with a sprocket wheel 11 around which passes a sprocket chain 12. The sprocket wheel 13 is mounted upon the rotating shaft of the gang of disks and the sprocket chain 12 also passes around the sprocket wheel 13. The beveled gear wheel 14 is slidably mounted upon the shaft 10 but by reason of the non-circular contour of the said shaft the sprocket wheel 14 is caused to rotate with the same. The guide 15 is secured to the side of the bearing 4 by means of the bolts 16, said guide is provided with a wheel 17 which bears against the side of the wheel 14 and holds the gear teeth of the wheel 14 in mesh with the pinion 8. The rearward edge portion of the bar 1 is provided with a series of perforations 18. One end of the spring 19 is attached to the bearing 4 and the opposite end of the said spring is provided with a pin 20 which is adapted to be inserted in one of the perforations 18.

The attachment is so applied to the frame of a disk harrow or similar implement that the member 7 will be in engagement with the edge of one of the disks thereof. Consequently as the implement is moved over the field and the disk shaft is rotated rotary movement is transmitted to the shaft 10 through the instrumentality of the sprocket wheels 11 and 13 and the sprocket chain 12. As the shaft 10 rotates the wheel 14 which is in mesh with the pinion 8 the shaft 6 and member 7 is rotated. Thus, as the disk against which the member 7 bears rotates the said member also rotates and sharpens the edge thereof. Should it be desired to rotate the member 7 in the reverse or opposite direction one of the arms 9 is sprung sidewise so that the end of the shaft 10 is disengaged therefrom and the said shaft is then moved laterally so as to disengage the wheel 14 from the pinion 8. The said wheel 14 is slipped longitudinally off of the shaft 10 and is reversed or turned around and again slipped upon the shaft so that it engages the opposite side of the pinion 8. The end of the shaft 10 is then sprung into position between the arms 9 and the guide 15 is removed from the side of the bearing 4 upon which it was originally located and is transferred to the opposite side thereof where the wheel 17 performs its function in holding the wheel 14 in engagement with the pinion 8. The perforations in the bearing 4 which receive the bolts 16 pass transversely through the bearing in order that the guide 15 may be located upon either side of the said bearing.

It is obvious that the bearing 4 may be shifted longitudinally along the bar 1 and will be supported in such an adjusted position by the hooks 5 which are located under the edge of the flange 3. After the bearing 4 has been properly positioned so as to bring the member 7 in contact with the edge of the particular disk desired to be sharpened the spring 19 is elongated longitudinally and the pin 20 is inserted in one of the perforations 18 in the bar 1 whereby the member 7 is held against the edge of the disk by spring tension. Thus the bearing 4 may move laterally while the disk is being sharpened in order that the member 7 may ride over abrupt irregularities at the edge of the same.

Having thus described my invention, what I claim as new and desire to secure by Letters-Patent is:—

1. A disk implement attachment comprising a bar, a bearing slidably mounted thereon, a resilient means for checking the sliding movement of the bearing, a shaft journaled in the bearing a sharpening member attached to the shaft and means for rotating the shaft.

2. An attachment for a disk implement comprising a bar having a series of perforations, a bearing slidably mounted upon the bar, a spring connected to the bearing and having means for engaging one of the perforations in the bar, a shaft journaled in the bearing, a sharpening member attached to the shaft and means for rotating the shaft.

3. An attachment for a disk implement comprising a supported bearing, a shaft journaled for rotation therein, a sharpening member carried by the shaft, a pinion attached to the shaft, a second shaft located at a right angle to the first shaft, a gear wheel mounted upon the second shaft and adapted to be adjusted thereon so as to engage said pinion at either side of the first said shaft.

4. An attachment for a disk implement comprising a supported bearing, a shaft journaled therein, a sharpening member attached to said shaft, a pinion attached to the shaft, a second shaft located at a right angle to the first said shaft, a gear wheel mounted upon the second said shaft and being adapted to be adjusted thereon so as to engage the pinion at either side of the first said shaft and a guide adapted to be mounted upon either side of the bearing for holding the gear wheel in mesh with the pinion.

5. An attachment for a disk implement comprising a bar, a bearing slidably mounted thereon, a shaft journaled in said bearing, a sharpening member attached to said shaft, a pinion attached to the shaft, a non-circular shaft mounted upon the attachment and extending parallel with the bar, a wheel slidably mounted upon the non circular shaft, and means for holding said wheel in engagement with the pinion.

In testimony that I claim the foregoing as my own, I have hereto affixed my signature in the presence of two witnesses.

WM. O. HARDMAN.

Witnesses:
GEORGE N. PERKINS,
JOHN HARDMAN.